Figure 1:
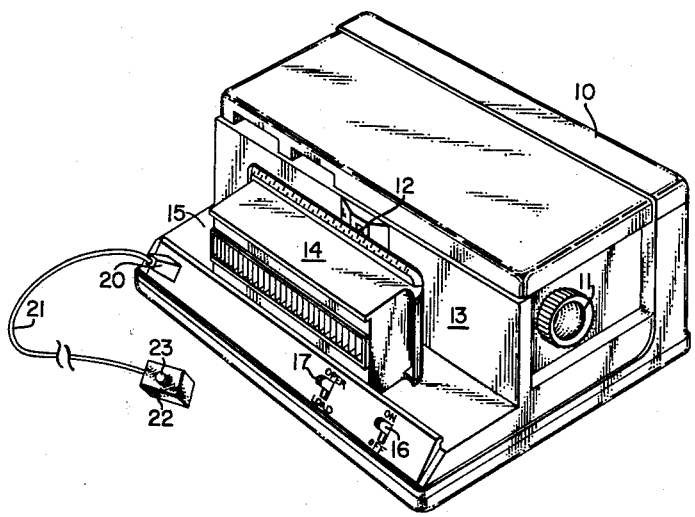

Jan. 8, 1963 R. F. McCAMMON 3,072,016
SLIDE PROJECTOR WITH REMOTE CONTROL FOR
REVERSING THE SLIDE STORAGE TRAY
Filed Sept. 22, 1961 2 Sheets-Sheet 1

INVENTOR.
ROBERT F. McCAMMON
BY
ATTORNEY

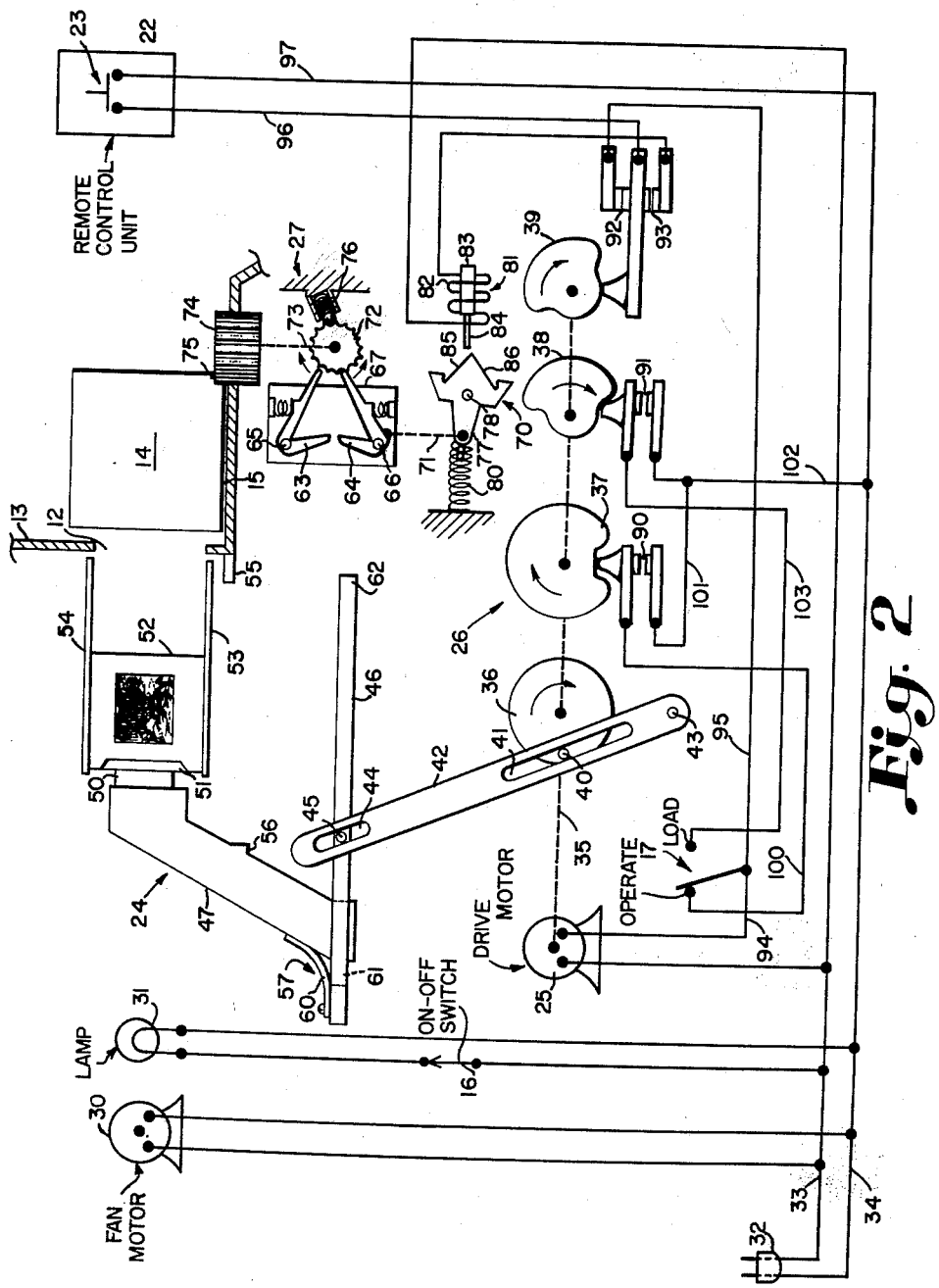

United States Patent Office
3,072,016
Patented Jan. 8, 1963

3,072,016
SLIDE PROJECTOR WITH REMOTE CONTROL FOR REVERSING THE SLIDE STORAGE TRAY
Robert F. McCammon, Denver, Colo., assignor to Minneapolis-Honeywell Regulator Company, Minneapolis, Minn., a corporation of Delaware
Filed Sept. 22, 1961, Ser. No. 140,093
6 Claims. (Cl. 88—28)

This invention is concerned with an improved photographic projector and particularly with a projector of the automatic type wherein a single remotely located electrical switch is effective to produce two different modes of operation of the automatic projector, depending upon the time duration of actuation of the remote switch.

An automatic photographic projector has become characterized in the art as a projector which is utilized with a photographic slide storage tray holding a plurality of individual photographic slides. This tray is placed on a slide tray receiving platform on the projector and slide changing means disposed within the projector is effective to move slides from the tray to the optical axis of the projector, wherein the slide may be displayed on a screen or the like. The automatic projector likewise is provided with storage tray moving means which is effective, in a cycle of operation of the automatic projector, to move the slide storage tray in a step fashion to bring a succeeding slide into cooperative relation with the slide changing means, during a particular portion of the cycle of the automatic projector. Projectors of this type readily adapt themselves for operation from a remote position, thus allowing the operator of the projector to position himself at a position remote from the projector and to control the operation of the projector by means of a remote control unit, thus allowing the operator of the projector to more readily enjoy the particular scenes being displayed on the screen.

The present invention contemplates such an automatic projector wherein the remote control unit is provided with a single normally open switch, the momentary closing of which causes slide changing in a normal sequence. Prolonged closing of the remote control switch likewise causes the slides to be changed, but, in a unique fashion, the direction of movement of the slide tray is reversed, thus allowing the operator of the projector to control the movement of the slide storage tray, causing the tray to move in one direction or the other, depending upon how long the remote control switch is held in a closed condition. With such a construction, the operator of the projector may reshow slides previously shown, and then, again reverse the direction of movement of the slide storage tray to go on with the normal sequence of presenting slides in the tray.

Selective control of the direction of movement of the slide storage tray in an automatic photographic projector has been accomplished by structures in the prior art. However, I provide a unique construction, incorporating cycling switch means located at the projector, to perform this function by the use of a single normally open switch which may be located at a remote position if desired. My construction, being relatively simple and thus inexpensive, also allows the use of a remote control unit which switches relatively high voltages, this being accomplished in a safe manner and in a relatively inexpensive manner by virtue of the fact that my remote control unit utilizes but a single switch, thus high voltage circuit isolation and insulation problems attendant the use of multiple switching are avoided.

Figure 3:
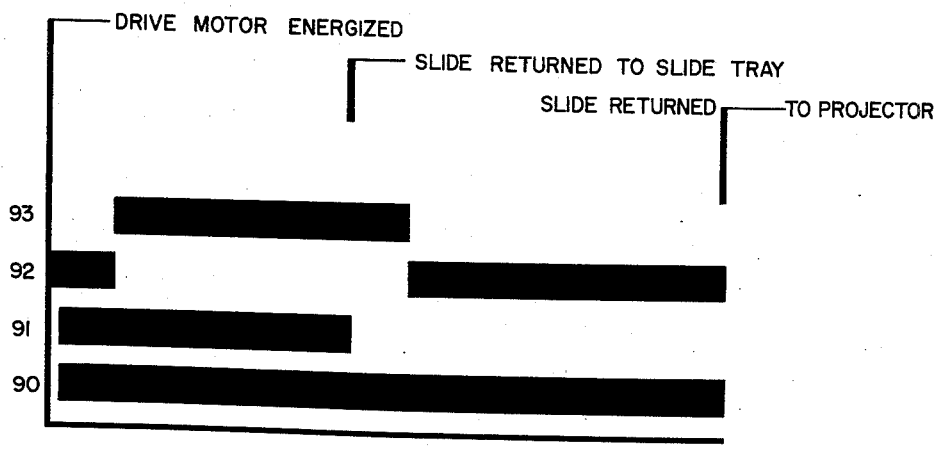

My invention will be apparent to those skilled in the art upon reference to the following specification, claims, and drawings, of which:

FIGURE 1 is a perspective view of an automatic projector,

FIGURE 2 is a combined mechanical and electrical circuit schematic showing my invention applied to a particular type slide changing means and slide tray advancing means, and FIGURE 3 is a bar graph showing, by means of the solid bar portions, the time periods in a cycle of operation of the automatic projector wherein the cycling switch means of FIGURE 2 has its particular switches disposed in a closed condition.

Referring to FIGURE 1, reference numeral 10 designates the housing of an automatic photographic projector having an objective lens 11 disposed at the forward part of the housing. Objective lens 11 cooperates with a light source and condensing lens means, not shown, to form an optical axis along which light is projected through a photographic slide to thus present the image on the slide to a screen or the like for viewing by an audience. Reference numeral 12 designates a slide receiving window formed in the side wall 13 of the projector, this window 12 being adapted to receive slides disposed within a slide storage tray 14 located on a tray platform 15 of the projector. This tray 14 is provided with a plurality of individual compartments to hold individual photographic slides in a side by side relationship. As is well known, this slide tray is adapted to move along platform 15 in a step-like fashion to bring succeeding slides into cooperative relation with the slide receiving window 12, whereupon the slides may be moved from the tray 14, through the window 12, into alignment with the optical axis disposed within the projector. Also, tray 14 may move in either direction, that is it may advance toward the front of the projector wherein the objective lens 11 is located, or it may progress in the opposite direction toward the back of the projector. Reference numeral 16 designates an on-off switch disposed at the control panel of the projector whereas reference numeral 17 designates a control switch having a load and an operate position. Reference numeral 20 identifies an outlet jack connected by means of a cord 21 to a remote control unit 22 having a normally open change switch 23 disposed within the unit.

The representation of FIGURE 1 is intended to be representative of many configurations of an automatic photographic projector which is effective, with switch 17 in the operate position, to cause a slide to be returned from the optical axis of the projector to the storage tray, the tray then to be moved a distance equal to the spacing of the slides within the tray, and a further slide to be then returned to the optical axis of the projector for display on a screen or the like, this cycle of operation being controlled by momentary closing of the change switch 23. My invention is directed to the unique manner in which change switch 23 may be actuated for a prolonged period of time to reverse the direction of movement of the storage tray 14, as will be apparent upon reference to FIGURE 2.

In FIGURE 2, reference numeral 24 designates generally a slide changing means which receives its operating force from a drive motor 25. Drive motor 25 also controls a cycling switch means 26 and a slide tray moving means 27.

FIGURE 2 also discloses a fan motor 30 which is disposed within the housing 10 of FIGURE 1 and provides circulation of air to cool the components, including the slides, which are disposed within the housing of the projector. Reference numeral 31 identifies the light source in the form of a lamp, also located within the housing 10. Operating voltage is applied to the apparatus of FIGURE 2 by means of a connector 32 adapted to be connected to a source of alternating voltage, not shown. Fan motor 30 is directly connected across conductors 33 and 34 associated with connector 32 and thus the fan motor is continuously energized when connector 32 is connected to a source of operating voltage. Lamp 31, on the other hand, is connected to conductors 33 and 34 through the on-off switch 16, the lamp being energized when switch 16 is in the on position.

Referring now specifically to the drive motor 25, this motor is operatively connected by means of mechanical drive linkage 35 to control cams 36, 37, 38 and 39. Cam 36 carries a pin 40 which cooperates with an elongated slot 41 formed in a pivoted drive link 42, link 42 being pivoted at pivot 43. The upper end of drive link 42 is provided with a further elongated slot 44 cooperating with a pin 45 fixed to a movable plate 46 of the slide changing means 24. Energization of drive motor 25 is effective to cause rotation of cam 36 in a clockwise direction, as indicated, to thus cause drive link 42 to pivot first to the right and then back to the left for a complete cycle of rotation of cam 36. Thus, the movable plate 46, as shown in FIGURE 2 disposed at its extreme left-hand position, is effective to move to the right and then back to the left-hand position for a cycle of operation of drive motor 25.

Movable plate 46, slideably disposed within the projector of FIGURE 1 by means not shown, slideably carries at its left-hand end a support member 47 which supports a magnet 50. In FIGURE 2, magnet 50 is shown engaging a metallic clip member 51 disposed at the edge of a photographic slide 52. Photographic slide 52 rides in slide guides 53 and 54 and is shown disposed at the optical axis of the projector, this slide having been withdrawn from the slide storage tray 14 through the slide receiving window 12 in the side wall 13 of the projector.

Reference numeral 55 identifies a stop member disposed on the internal surface of the side wall 13 of the projector and adapted to cooperate with portion 56 of the support member 47. Thus, as member 46 moves in a right-hand direction, slide 52 is returned to the slide storage tray 14 and at that time members 55 and 56 engage to limit the movement of member 47 and magnet 50. Plate 46 continues to move in the right-hand direction by virtue of an overtravel or lost motion coupling 57. This coupling may constitute a resilient spring member 60 which is attached to plate 46 and engages support member 47 to bias member 47 to the right-hand end of an elongated opening 61 formed in plate 46, support member 47 being slideably held within opening 61. Thus, upon members 55 and 56 engaging, this being accomplished when slide 52 has been returned to the slide storage tray 14, the spring 60 deforms, allowing relative movement between members 46 and 47.

During this relative movement or overtravel, the extreme right-hand end 62 of plate 46 is operative to engage one or the other of the spring biased and pivoted drive links 63 and 64 of the slide tray moving means 27. Driving links 63 and 64 are pivoted at pivots 65 and 66 respectively and are mounted on a movable plate 67, this plate being movable under the control of an alternate action mechanism 70 by virtue of a drive link 71.

As will be apparent, movable plate 67 is movable from the position shown in FIGURE 2 wherein drive link 64 engages portion 62 of movable plate 46 to a lower position wherein drive link 63 engages portion 62.

Reference numeral 72 identifies a gear sector which cooperates with one or the other of the drive links 63 and 64 and which is connected by means of a mechanical connection 73 to a further gear sector 74. Gear sector 74 in turn engages a gear rack 75 formed on the slide storage tray 14 to thus facilitate step-like movement of the storage tray. Gear sector 72 is prevented from moving more than one gear tooth at a time by spring biasing means 76, this means allowing movement of the gear sector 72, one gear at a time, to thus advance the slide storage tray 14 one slide compartment at a time.

As has been mentioned, the position of plate 67 is controlled by over center mechanism 70. This mechanism includes a pivoted member 77, pivoted at 78 and biased to remain in one of its two actuated positions by means of a spring 80. The position of member 77 is controlled by a solenoid 81 having a coil 82 and a movable armature 83, the forward end of which carries a pivoted member 84 adapted to selectively engage the inclined surfaces 85 and 86. With member 77 disposed as shown in FIGURE 2, energization of winding 82 causes pivoted member 84 to engage inclined surface 85 and to cause member 77 to rotate in a counterclockwise direction about its pivot 78, thus drawing plate 67 in a downward direction. Spring 80, upon being drawn over center, causes member 77 to snap to a position wherein inclined surface 86 is aligned to cooperate with pivoted member 84 on a subsequent energization of winding 82, thus providing the alternate action to reset plate 77 to its other position upon subsequent energization of winding 82. As has been pointed out, movement of plate 67 in a downward direction causes drive link 63 to be moved into operative relationship with portion 62 of sliding plate 46 and thus this drive link is effective to cause gear sector 72 to move in a clockwise direction, thus changing the direction of movement of slide tray 14.

Drive links 63 and 64 are constructed and arranged to provide one-way drive of gear sector 72. In other words, with the apparatus as disposed in FIGURE 2, drive link 64, when moved clockwise by portion 62 of sliding plate 46, moves against the bias of its spring and engages a tooth in gear sector 72 to cause the sector 72 to rotate. Return movement of portion 62 allows link 64 to rotate counterclockwise as a result of its spring bias. This return movement does not however cause reverse rotation of gear sector 72. The exact manner of accomplishing this action has not been shown, for purposes of clarity. However, means may be provided to cause drive link 64 to slide under gear sector 72 during such return movement, or if desired a spring biased one-way tooth may be provided on the end of drive link 64 to allow such return movement while the one-way drive tooth passes by a tooth in sector 72 in a non-driving position.

This result is accomplished by a novel electrical circuit including cycling switch means controlled by cams 37, 38 and 39. Cam 37 cooperates with a normally open switch 90, cam 38 cooperates with a normally open switch 91, and cam 39 cooperates with a normally open switch 93 and a normally closed switch 92. FIGURE 3 shows the state of operation of the switches 90–93 for a complete cycle of operation of drive motor 25, showing by means of the bars the closed condition of the switches 90–93.

As has been mentioned, the apparatus as shown in FIGURE 2 shows the slide 52 positioned at the optical axis such that it may be displayed on a screen or the like. With switch 17 disposed in the "operate" position, the remote control switch 23, upon momentary closing, is effective to institute a cycle of operation of drive motor 25. This cycle of operation is instituted by an initial energizing circuit which may be traced from conductor 33 through motor 25, conductors 94 and 95, switch 92, conductor 96, switch 23, and conductor 97 to conductor 34. Thus, drive motor 25 begins operation and cams 36–39 begin rotating in a clockwise direction. As slide 25 begins moving to the right, guided by slide guides 53 and 54, cam 37 is effective to first close switch 90. The closing of this switch completes a holding energizing circuit for motor 25 which is independent of switch 23 and this circuit may be traced from conductor 33 through drive motor 25, conductor 94, switch 17 in the operate position, conductor 100, switch 90, and conductors 101 and 102 to conductor 34. Thus, continued rotation of drive motor 25 is no longer dependent upon the operator of the projector holding switch 23 in a closed position.

Rotation of drive motor 25 is also effective to cause switch 91 to close. Switch 91 is disposed in a second holding circuit for drive motor 25, this second holding circuit being effective when switch 17 is placed in the "load" position. This can be seen by tracing a circuit from conductor 33 through drive motor 25, conductor 94, switch 17 in the load position, conductor 103, switch 91, and conductor 102 to conductor 34.

Still further operation of the drive motor 25 is effective to cause switch 92 to be opened and switch 93 to be closed. The opening of switch 92 is effective to open the initial energizing circuit of motor 25, it being remembered that a maintaining circuit has now been established, and switch 93 is effective to condition winding 82 of solenoid 81 for energization, as will be described.

With switch 17 in the operate position, and with the remote control switch 23 momentarily closed as has been assumed, the slide 52 is returned to the slide storage tray 14, whereupon members 55 and 56 engage to thus limit the movement of support member 47 and its magnet 50. Sliding bar 46 however continues to move with rotation of cam 36 and drive link 64 is engaged to cause gear sector 72 to rotate in a counterclockwise direction the distance spanned by adjacent teeth of the gear, thus causing slide tray 14 to be moved to bring a further slide into registry with the slide receiving window 12. Continued rotation of drive motor 25 is effective to cause this slide to be returned to the optical axis of the projector to thus be displayed on the screen or the like. As this slide is returned to the optical axis, cam 37 rotates to the point where its switch 90 again opens, thus completing a cycle of operation, restoring the apparatus to the position shown in FIGURE 2.

When it is desired to remove the slide tray from the platform 15 of the projector, for example when only a portion of the slides therein has been shown, switch 17 is placed in the load position and the remote control switch 23 is momentarily depressed. The momentary closing of remote control switch 23 is effective to establish the initial energizing circuit for motor 25, as above described. However, in this case the second above mentioned holding energizing circuit for drive motor 25 is effective and by virtue of the contour of cam 38, switch 91 is opened at the time that a slide has been returned to the slide storage tray 14, thus stopping the cycle of operation with all of the slides disposed within the slide storage tray 14. The slide storage tray may then be removed and a further tray may be replaced on platform 15. When this has been accomplished, switch 17 is returned to the operate position and the above mentioned holding energizing circuit including switch 90 is now effective to again energize drive motor 25 to return a slide from the new tray to the optical axis of the projector.

It will now be assumed that the operator of the projector desires to reverse the sequence of showing of the slides disposed within the tray 14, for example to again show a slide which was previously shown to the audience. If this is desired, the remote control switch 23 is closed and is maintained closed for a prolonged period of time greater than that necessary for establishment of the holding energizing circuit for motor 25 by virtue of switch 90. In order to accomplish this result, it is necessary for the operator of the projector to maintain switch 23 in a closed condition until switch 93 has been closed by operation of cam 39. When this is done, solenoid 81 has its winding 82 energized by virtue of a circuit which can be traced from conductor 33 through winding 82, switch 93, conductor 96, switch 23, and conductor 97 to conductor 34. As has been described, energization of winding 82 is effective to reset alternate action mechanism 70 to its other position, that is member 77 is pivoted in a counterclockwise direction about its pivot 78. Thus, by virtue of mechanical linkage 71, plate 67 is shifted in a downward direction to bring drive link 63 into operative relationship with both portion 62 of the sliding plate 46 and the gear sector 72. As the cycle of operation continues, the slide is returned to the storage tray 14 and sliding plate 46 engages drive link 63 to cause gear sector 72 to rotate in a clockwise direction, thus causing slide tray 14 to move in the opposite direction from that previously experienced as slides were selectively displayed with plate 67 disposed in its upper position, as shown in FIGURE 2. Thus, a momentary closing of switch 23 is effective to cause the slides to be changed without changing the sequence. In other words, as switch 23 is momentarily closed, tray 14 continues to move in a given direction. However, when switch 23 is closed and held closed for a prolonged period of time equivalent to that portion of the cycle of operation necessary to cause switch 93 to close, then the slide changing is affected, but in this case the slide changing is affected to show the slides previously displayed by virtue of a reverse movement of the slide tray 14.

A further feature of my invention resides in the manner in which switches 92 and 93 are controlled such that switch 92 opens to insure that prolonged closing of switch 23 will not affect the energizing circuit of drive motor 25 but will only be effective to control the energization of solenoid 81 by virtue of the closing of switch 93. This is important during the mode of operation of my invention wherein switch 17 is placed in the load position and it is desired to stop the operation of drive motor 25 before the cycle of operation has been completed and when all slides have been returned to the slide storage tray 14. When switch 17 is placed in the load position, prolonged closing of switch 23 does not control energization of drive motor 25 by virtue of the fact that the energizing circuit for the drive motor is opened at switch 92, as can be seen by reference to the graph of FIGURE 3.

From the above description it can be seen that I have provided a unique photographic projector wherein a single switch 23 is effective to cause the slides within a slide storage tray 14 to be displayed on a screen or the like in a definite sequence, as these slides are stored within the storage tray. However, if it is desired to reverse the sequence of showing of these slides, switch 23 is held closed for a prolonged period of time and, as a result of the unique electrical circuit incorporating the cycling switch means 26, the direction of movement of slide tray 14 is reversed. Furthermore, my electrical circuit incorporates a load-operate switch to allow removal of the slide tray 14 with all slides disposed within the tray and furthermore I provide a switch of my cycling switch means 23 which is effective to prevent interaction between the remote control switch 23 and the drive motor 25 when my switch 17 is placed in the load position.

Other modifications of my invention will be apparent to those skilled in the art and it is therefore intended that the scope of this invention be limited solely by the scope of the appended claims.

I claim as my invention:

1. An automatic photographic slide projector comprising; a slide storage tray adapted to hold a plurality of photographic slides, slide changing means cooperating with said storage tray and operative to move slides between the storage tray and the optical axis of the projector, storage tray advancing means including electrically operable means, said storage tray advancing means cooperating with said storage tray and operative to effect movement of said storage tray in a forward or a reverse direction, an electrical drive motor; means operatively connecting said drive motor to said slide changing means and said storage tray advancing means to return a slide to the storage tray, move the storage tray, and then return a further slide to the optical axis of the projector upon energization of said motor; a remotely located normally open switch, initial energizing circuit means for said motor adapted to be completed by said remote switch, a first normally open motor switch to be closed upon initial motor energization, holding energizing circuit means for said motor adapted to be completed by said first motor switch to provide a complete cycle of the changing of a slide, a second normally open motor switch to be closed upon motor energization after said first motor switch is closed, and circuit means including said remote switch and said second motor switch to energize the electrically operable means of said tray advancing means to change the direction of movement of said storage tray upon prolonged actuation of said remote switch.

2. An automatic photographic slide projector comprising; means defining an optical axis for the projector, a slide storage tray, slide changing means cooperating with said storage tray, storage tray advancing means cooperating with said storage tray, electrically energizable means cooperating with said advancing means to reverse the direction of movement of said storage tray, an electric motor cooperating with said changing means and said advancing means to supply operating force therefor upon energization of said motor, a normally open control switch adapted to be closed to initiate a cycle of operation wherein a slide is moved from the optical axis of the projector to the storage tray, the storage tray is moved, and a further slide is then returned to the optical axis, initial energizing circuit means for said motor including said control switch, holding energizing circuit means for said motor including means controlled by said motor to maintain said motor energized for said cycle of operation, a normally open motor switch which is closed after said holding energizing circuit means is effective to maintain motor operation, and energizing circuit means for said electrically energizable means including said control switch and said motor switch, whereby momentary closing of said control switch provides slide changing and prolonged closing of said control switch provides slide changing with reversed direction of movement of said storage tray.

3. In an automatic photographic projector having a light source and lens means defining an optical axis for the projector, a slide storage tray holding a plurality of individual photographic slides, slide changing means adapted to move individual slides between said storage tray and said optical axis, tray moving means adapted to move said storage tray after a slide has been returned thereto to bring a further slide into cooperative relation with said slide changing means whereupon the further slide is moved to said optical axis, and motor means to supply motive power for said slide changing means and said tray moving means, electrical circuit means including a control switch to energize said motor upon actuation of said control switch and to maintain it energized through a cycle of operation independent of continued actuation of said control switch to return a slide to the storage tray, move said tray, and then return a further slide to said optical axis; further electrical circuit means effective only upon continued actuation of said control switch and also effective only after a prolonged period of energization of said motor to energize further electrical means, and means connecting said further electrical means to said tray moving means to reverse the direction of movement of said storage tray upon prolonged actuation of said control switch.

4. In an automatic photographic projector of the type having means defining an optical axis, a slide storage tray containing a plurality of photographic slides, slide changing means operable to move slides from the tray to the optical axis for display on a screen or the like, reversible tray moving means operable to move the tray upon the return of a slide to the tray to thus bring a further slide into cooperative relationship with the slide changing means so that the further slide may be moved to the optical axis, and an electric motor operatively coupled to said slide changing means and to said tray moving means; a normally open remote control switch, initial energizing circuit means for said motor to energize the same upon momentary closing of said remote control switch to initiate a cycle of operation whereby a slide is returned to the tray, the tray is moved, and a further slide is returned to the optical axis, maintaining energizing circuit means for said motor completed upon momentary energization of said motor to maintain energization thereof to the end of said cycle of operation independent of said remote control switch, electrically energizable means coupled to the tray moving means to control the direction of movement of the tray, and further circuit means including said electrically energizable means to control the tray moving means, said further circuit means being controlled by said motor to energize said electrically energizable means only upon prolonged closing of said remote control switch to thereby change the direction of movement of the tray during that portion of said cycle of operation.

5. An automatic photographic projector having a slide storage tray and a control circuit to provide remote operation of the projector to provide selective slide changing with or without reversing the sequence of showing of the slides within the tray, comprising; slide changing means, slide tray moving means, an electric motor, means placing said motor in cooperating relation with said changing means and said moving means to drive the same, motor switch means controlled by said motor and having first, second and third normally open motor switches, a two position control switch, a normally open remote control switch, an initial energizing circuit for said motor including said remote control switch; a first and a second holding energizing circuit for said motor, said first and second holding energizing circuits including said first and second motor switches respectively and said two positon control switch, said two position control switch selecting the holding energizing circuit to be effective; said first holding energizing circuit being effective to maintain said motor energized independent of said remote control switch for a cycle of operation wherein a slide is moved from the projector to the tray, the tray is moved, and a further slide is moved from the tray to the projector; said second holding energizing circuit being effective to maintain said motor energized independent of said remote control switch for only that portion of said cycle of operation to move a slide from the projector to the tray to facilitate removal of the tray from the projector; a reversing solenoid, means placing said solenoid in cooperating relation with said moving means to effect reverse movement of the tray during that portion of said cycle of operation upon energization of said solenoid, and an energizing circuit for said solenoid including in series connection said remote control switch and said third motor switch to energize said solenoid and thus reverse the direction of movement of the tray in the event that said remote control switch is maintained closed for a prolonged period of time longer than that period necessary to establish one of said holding energizing circuits for said motor.

6. An automatic photographic projector as defined in claim 5 additionally having a normally closed motor switch connected in series circuit with said remote control switch in said initial energizing circuit for said motor, said normally closed motor switch being effective to open said initial energizing circuit after one of said holding energizing circuits has been established for said motor to prevent completion of said cycle of operation by prolonged closing of said remote control switch when said two position control switch has been actuated to select said second holding energizing circuit.

References Cited in the file of this patent

UNITED STATES PATENTS

| 3,001,445 | Mulch et al. | Sept. 26, 1961 |
| 3,006,243 | Zillmer | Oct. 31, 1961 |
| 3,023,669 | Hall | Mar. 6, 1962 |

FOREIGN PATENTS

| 1,104,216 | Germany | Apr. 6, 1961 |